(12) United States Patent
Mardikar

(10) Patent No.: US 9,060,271 B2
(45) Date of Patent: Jun. 16, 2015

(54) SECURE SHORT MESSAGE SERVICE (SMS) COMMUNICATIONS

(71) Applicant: EBAY INC., San Jose, CA (US)

(72) Inventor: Upendra Mardikar, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 14/034,279

(22) Filed: Sep. 23, 2013

(65) Prior Publication Data

US 2014/0185806 A1 Jul. 3, 2014

Related U.S. Application Data

(63) Continuation of application No. 12/341,987, filed on Dec. 22, 2008, now Pat. No. 8,543,091.

(60) Provisional application No. 61/059,395, filed on Jun. 6, 2008, provisional application No. 61/059,907, filed on Jun. 9, 2008.

(51) Int. Cl.
*H04M 1/66* (2006.01)
*H04W 12/04* (2009.01)
*H04L 12/58* (2006.01)
*H04W 4/14* (2009.01)

(52) U.S. Cl.
CPC ........... *H04W 12/04* (2013.01); *H04L 12/5895* (2013.01); *H04L 51/38* (2013.01); *H04W 4/14* (2013.01)

(58) Field of Classification Search
CPC ......... H04W 12/04; H04W 4/00; H04W 4/14; H04W 4/06; H04W 4/12; H04W 4/02; H04W 60/00; H04L 51/38
USPC .............. 455/411, 466, 410, 407, 419, 435.1, 455/557, 558; 713/176, 171, 161; 380/247, 380/249, 270, 259, 278, 232, 258
See application file for complete search history.

(56) References Cited

U.S. PATENT DOCUMENTS

| | | | |
|---|---|---|---|
| 8,099,772 B2 * | 1/2012 | Takada et al. | 726/10 |
| 8,543,091 B2 * | 9/2013 | Mardikar | 455/411 |
| 2006/0115084 A1 * | 6/2006 | Ryu | 380/247 |
| 2007/0255652 A1 * | 11/2007 | Tumminaro et al. | 705/39 |
| 2013/0198086 A1 * | 8/2013 | Mardikar | 705/71 |

* cited by examiner

*Primary Examiner* — Khai M Nguyen
(74) *Attorney, Agent, or Firm* — Haynes & Boone, LLP

(57) ABSTRACT

Embodiments of the present disclosure provide systems and methods for secure Short Message Service (SMS) communications. According to an embodiment, a method of providing secure Short Message Service (SMS) communications comprises requesting that SMS data to be sent from a client device to a remote location be encrypted. The method also comprises encrypting the SMS data by processing the SMS data with a Message Authentication Code (MAC) and a timestamp and/or counter along with second factor authentication information. The method further comprises sending the encrypted SMS data to the remote location by a secure SMS application via a regular SMS channel of the client device.

20 Claims, 4 Drawing Sheets

SECURE SHORT MESSAGE SERVICE (SMS) COMMUNICATIONS

RELATED APPLICATIONS

This application is a continuation of U.S. application Ser. No. 12/341,987 filed on Dec. 22, 2008 and claims priority to U.S. Provisional Application Ser. No. 61/059,395 filed on Jun. 6, 2008, and U.S. Provisional Application Ser. No. 61/059,907 filed on Jun. 9, 2008, the contents of which are hereby incorporated by reference in their entirety.

BACKGROUND

1. Technical Field

Embodiments of the present disclosure generally relate to electronic communications, and more particularly, to methods and systems for sending and/or receiving Short Message Service (SMS) communications in a secure manner.

2. Related Art

Short Message Service (SMS) is a communications protocol that allows the interchange of short text messages between mobile devices. SMS text messaging has become the most widely used tool of communications in many business and personal situations having billions of active users sending and receiving text messages on their mobile devices.

The ubiquitous worldwide use of mobile devices and SMS text communications has posed risks for users of having their SMS text communications intercepted, read or pried upon by, in some cases, unwelcome third parties. In particular, this is a problem when users want to send or receive passwords, account numbers, personal details, confidential messages or other sensitive information.

Some companies still use insecure SMS text messaging in relation to, for example, payment systems or financial transactions. To get around such insecure text messaging, such companies may use an Interactive Voice Response (IVR) call back system to obtain, for example, a Personal Identification Number (PIN). This may create bad user experience because, for example, IVR is often criticized as being unhelpful and difficult to use due to poor design and lack of appreciation of the user's needs. IVR is an insecure channel itself and provides no guarantee of a strong second factor of authentication.

Also, in view of the risks posed in potentially having sensitive information detected by third parties, services have been offered for use against SMS prying. Such services may encrypt every text message during transfer, which remains encrypted on the user's mobile phone, thus preventing unwelcome third parties from deciphering private text messages. Text messages may appear scrambled until a correct password is entered. However, the services offered in connection with these services are inconvenient in that they must be downloaded similarly to, for example, a ringtone. Also, such services have no hardware support as their key management is in software.

Furthermore, in some typical SMS communications, for example, in online payment systems, a Wireless Application Protocol (WAP) or other typical protocols may be employed for mobile payments or financial transactions. This requires Internet access from the mobile device, which means that users must sign up for a data plan. Because exchanging data over protocol channels such as WAP is expensive to use for SMS type data, users tend not to use such protocol services.

SUMMARY

As will be further described herein in relation to one or more embodiments, methods and systems are provided for a secure Short Message Service (SMS) so that secure communications may be exchanged over regular SMS interfaces without the need of expensive protocol channels while meeting the user's need for convenient, friendly and confidential SMS communication exchanges within a trusted environment.

In accordance with an embodiment of the disclosure, a method of providing secure Short Message Service (SMS) communications comprises requesting that SMS data to be sent from a client device to a remote location be encrypted. The method also comprises encrypting the SMS data by processing the SMS data with a Message Authentication Code (MAC) and a timestamp and/or counter along with second factor authentication information. The method further comprises sending the encrypted SMS data to the remote location by a secure SMS application via a regular SMS channel of the client device.

In accordance with another embodiment of the disclosure, a client device comprises: one or more processors; and one or more memories adapted to store a plurality of machine-readable instructions which when executed by the one or more processors are adapted to cause the client device to: request that SMS data to be sent from the client device be encrypted; encrypt the SMS data by processing the SMS data with a Message Authentication Code (MAC) and a timestamp and/or counter along with second factor authentication information; and send the encrypted SMS data to a remote location by a secure SMS application via a regular SMS channel of the client device.

In accordance with another embodiment of the disclosure, a secure SMS system comprises a client in communication with a remote location via a network. The secure SMS system also comprises one or more processors and one or more memories adapted to store a plurality of machine-readable instructions. When executed by the one or more processors, the machine-readable instructions are adapted to cause the client device to encrypt SMS data to be sent from the client device by generating a Hash Message Authentication Code (HMAC) using an encryption algorithm and applying the HMAC to a combination of a timestamp and/or counter with second factor authentication information in a component of the client device; and send encrypted SMS data via a secure SMS application using a regular SMS channel of the client device to the remote location.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with one or more embodiments described herein, methods and systems are provided for secure Short Message Service (SMS) communications wherein components such as a secure SMS application are built into a client device, which may encrypt/decrypt SMS messages or data to ensure a secure and private communications exchange. The exchange of such secure SMS communications involves encryption and/or decryption of SMS messages or data with a strong second factor authentication without the need of, for example, Interactive Voice Response (IVR) callbacks to address security or confidentiality concerns. Secure SMS may enable users to send sensitive information over text messages as well as, for example, perform financial transactions such as sending money using a mobile Personal Identification Number (PIN). In one or more embodiments described herein, secure SMS communications may be performed without inconvenient downloads, Internet access from the client device, or exchange of data over expensive protocols.

Figure 1:
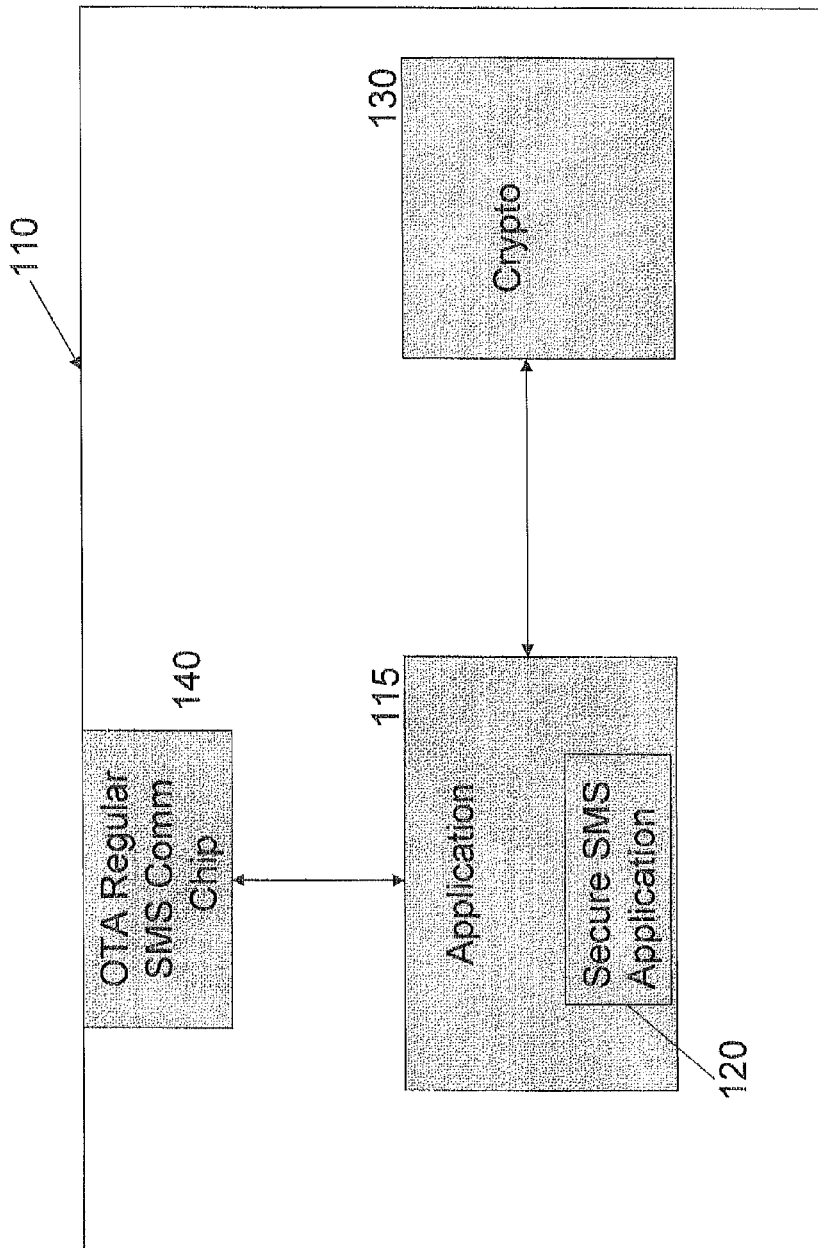
FIG. 1 is a block diagram illustrating components inside a client device for use in a secure Short Message Service (SMS) flow according to an embodiment of the present disclosure.

Referring now to the drawings wherein the showings are for purposes of illustrating embodiments of the present disclosure only, and not for purposes of limiting the same, FIG. 1 is a block diagram illustrating components inside a client device for use in a secure Short Message Service (SMS) flow according to an embodiment of the present disclosure.

A client device 110 includes an Application component or block (Application block) 115 where applications may be loaded. One application that may be loaded in Application block 115 is a secure SMS application 120. It should be noted, however, that secure SMS application 120 may alternatively be located outside Application block 115 separately or as part of another block or component of client device 110. Secure SMS application 120 is in communication with a Crypto component or block (Crypto block) 130 and with an Over the Air (OTA) regular SMS communications chip 140. It should be appreciated that components of client device 110 including Application block 115 and Crypto block 130 may comprise a Secure Element (SE), a Universal Integrated Circuit Card (UICC) with a Subscriber Identity Module (SIM) application, smart cards or other suitable devices.

Application block 115 may also include other pre-loaded applications, for example, a payment service provider application to facilitate financial transactions. In addition, client device 110 may include various applications as may be desired in particular embodiments to provide desired features to client device 110. For example, in various embodiments, applications may include security applications for implementing client-side security features, programmatic client applications for interfacing with appropriate application programming interfaces (APIs) over a network, or other types of applications.

Crypto block 130 may include credentials, payment instruments, certificates and/or keys that may be preloaded therein. For example, to personalize client device 110, an X509 key-pair, EMV (Europay, MasterCard, VISA), Elliptic Curve Cryptography (ECC) and/or RSA algorithms for public encryption may be preloaded in Crypto block 130.

Client device 110 may further include identification information such as, for example, a Secure Element number or identification (ID), the client device's unique identifier number such as an International Mobile Equipment Identity (IMEI) number, or a unique number associated with a user of a client device such as an International Mobile Subscriber Identity (IMSI) number, which may be stored inside the client device, for example, in a component such as an SE, a UICC/SIM card, a smart card or any other suitable card of the client device. One or more user identifiers may be implemented, for example, as operating system registry entries, cookies associated with a browser application, identifiers associated with hardware of client device 110, or other appropriate identifiers. In one embodiment, a user identifier may be used by a payment service provider to associate client device 110 (or correspondingly the user) with a particular account maintained by the payment service provider.

For logical end-to-end security, both Application block 115 and Crypto block 130 may have an authenticated and encrypted channel. For physical security, both Application block 115 and Crypto block 130 follow at least FIPS 140-2 Level 3 (tamper proof and copy protection) and Common Criteria ISO 15408 EAL 4+. Also, the components or blocks are global and may work with GSM, UMTS and/or CDMA enabled client devices.

Client device 110 may be implemented using any appropriate combination of hardware and/or software configured for wired and/or wireless communication over a network. For example, in one embodiment, client device 110 may be implemented as a personal computer of a user in communication with the Internet or another network. In other embodiments, client device 110 may be implemented as a wireless telephone, a personal digital assistant (PDA), a key fob, a smart card, a notebook computer and/or other types of computing devices.

Figure 2:
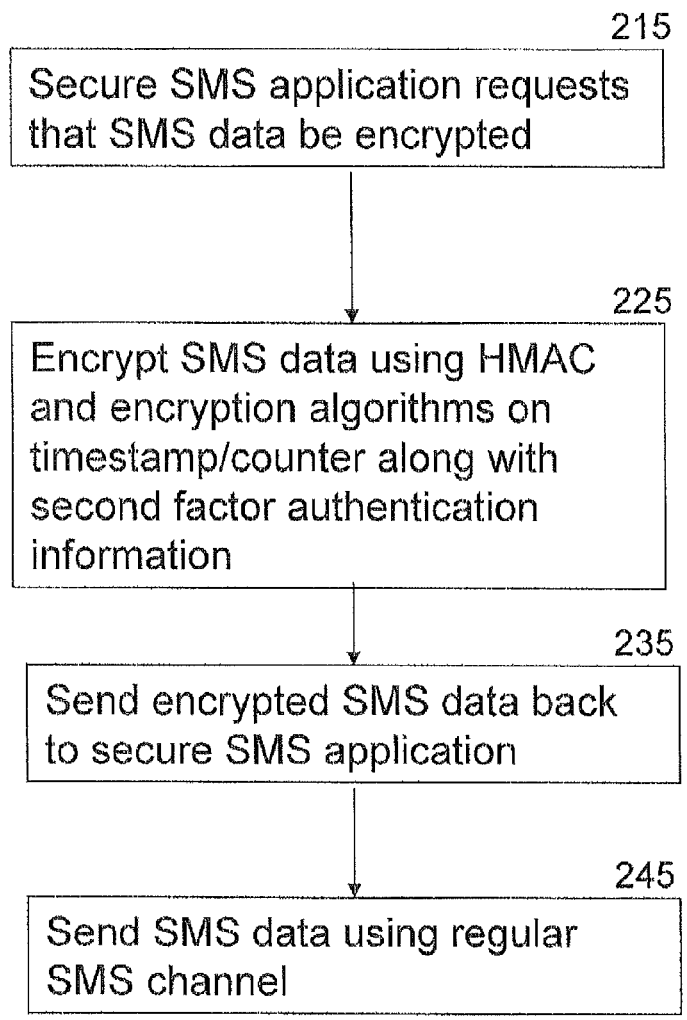
FIG. 2 is a flowchart for a secure SMS flow inside the client device of FIG. 1 according to an embodiment of the present disclosure.

Referring now to FIG. 2, a flowchart for a secure SMS flow inside the client device of FIG. 1 is provided according to an embodiment of the present disclosure. In block 215, when an SMS message or data is to be sent out from client device 110 in an encrypted manner, for instance, when a financial transaction with client device 110 is made or sensitive information is to be sent out using SMS text messaging, secure SMS application 120 requests Crypto block 130 to encrypt the message or data.

In block 225, Crypto block 130 encrypts the SMS message or data by processing it through, for example, a keyed-Hash Message Authentication Code (HMAC) using an RSA algorithm or Elliptic Curve Cryptography (ECC), and applying it to a combination of a timestamp and/or counter along with second factor authentication information.

In general, a three factor authentication for secure SMS text messaging may be used. The first factor involves what a user knows, for example, a password or a PIN. The second factor involves what a user has, for example, a token or the client device itself. Finally, the third factor involves what the user is, for example, biometrics may be used for identification purposes such as a fingerprint or retinal pattern.

According to one or more embodiments of the present disclosure, a strong second factor authentication may be provided to verify the authenticity of the client device or user. The encryption and processing of the SMS message or data may include applying an HMAC to a timestamp or counter along with pre-registered identification information for a particular user or a particular client device (also referred to as an identifier). That is, an identifier, such as an IMEI number or an IMSI number, which may be stored in, for example, a SIM card of the client device, is combined with a timestamp or counter and then HMAC is applied to the combination. This encryption and processing prevents a particular identifier from being sent out "as is" or by itself.

Identification information for a particular user or client device may be set during pre-registration. Identification information may be used with a timestamp and/or counter and HMAC, and is not needed subsequent to pre-registration. This allows for just the HMAC to be used the next time. Registration may be done one time via SMS or online over a network. Using an HMAC and a timestamp/counter, which is a private key, with, for example, the IMSI number, which is uniquely pre-registered, provides strong authentication compared to just sending an IMSI number by itself.

As it is well known in the art, HMAC is a type of message authentication code (MAC) calculated by a specific algorithm involving a cryptographic hash function in combination with a secret key. As with any MAC, it may be used to simultaneously verify both the data integrity and the authenticity of a message. Any iterative cryptographic hash function, such as MD5, SHA-1 or a function in the SHA-2 family, may be used in the calculation of an HMAC. A message or data may be encrypted using an encryption algorithm such as AES-256. According to one or more embodiments, the size of an SMS message may be adjusted so that the total size of the message is 160 characters to be sent in a single SMS message. That is, to fit the message in one single SMS, there may be two algorithm options, including: (i) an RSA algorithm with PKCS #1 padding, or (ii) Elliptic Curve Cryptography (ECC) wherein an output is 24 bytes in Base-48 encoding, and 32 bytes in Base-64 encoding. The data may then be less than 128 (160–32) bytes. Thus, an ECC or RSA algorithm may be used for encryption of the SMS message or data with HMAC. The counter and/or timestamp may be used for replay protection and HMAC may be attached. The message or data is thus encrypted internally in client device 110.

In block 235, the encrypted and processed data is sent back from Crypto block 130 to secure SMS application 120.

In block 245, secure SMS application 120 may then send the encrypted SMS message or data OTA using a regular SMS interface channel without the need of a special protocol channel such as a WAP channel.

Figure 3:
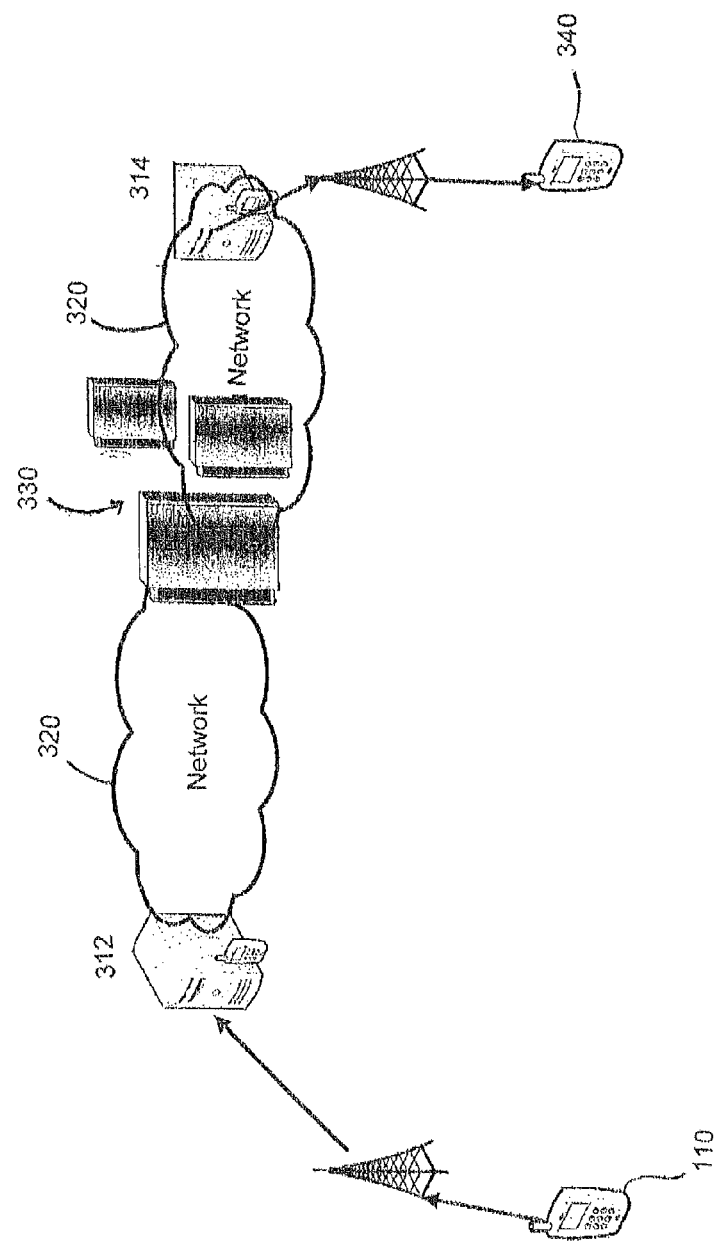
FIG. 3 illustrates a secure SMS flow system according to an embodiment of the present disclosure.

Referring now to FIG. 3, a secure SMS flow system is illustrated according to an embodiment of the present disclosure. Client device 110 is in communication with a remote location, for example, a secure SMS service provider or key manager 330 via a Mobile Network Operator (MNO) 312 over network 320. In turn, the remote location, for example, secure SMS service provider 330, is in communication with another client device 340 via MNO 314 over network 320.

Client devices 110 and 340 and the remote location, for example, secure SMS service provider 330, may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over network 320, which may be implemented as a single network or a combination of multiple networks. For example, in various embodiments, a network may include the Internet or one or more intranets, landline networks, wireless networks, and/ or other appropriate types of networks.

Figure 4:
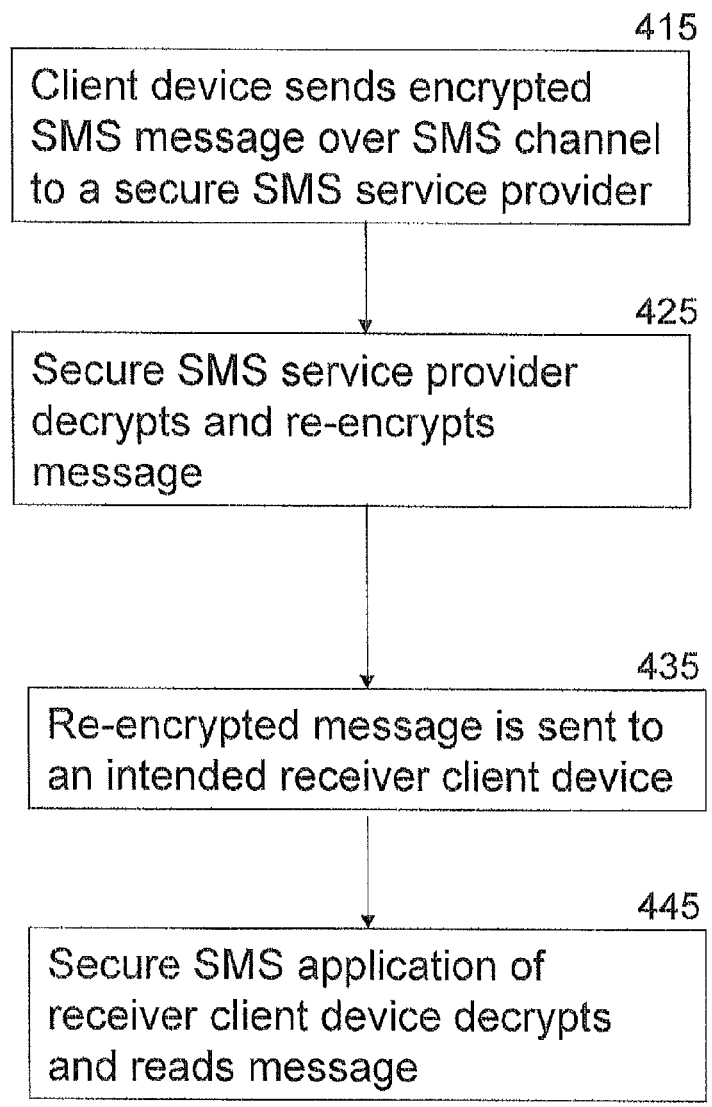
FIG. 4 is a flowchart for the secure SMS flow system of FIG. 3 according to an embodiment of the present disclosure.

Referring now to FIG. 4, a flowchart for the secure SMS flow system of FIG. 3 is illustrated according to an embodiment of the present disclosure.

In block 415, client device 110 sends an encrypted, HMAC with timestamp/counter SMS message or data through a regular SMS channel via MNO 312 over network 320 to a remote location, for example, to secure SMS service provider or key manager 330. In one embodiment, the remote location may comprise a payment service provider such as PayPal, Inc. As discussed above, the SMS message or data may be encrypted and processed with HMAC and a timestamp/counter along with an identification number, for example, an IMEI number, an IMSI number or an SE number for a second factor authentication.

In block 425, the remote location, for example, secure SMS service provider 330, receives the encrypted SMS message or data from client device 110 and finds out who the message is sent to. Secure SMS service provider 330 has keys registered for the sender as well as for an intended receiver such as client device 340. Secure SMS service provider 330 decrypts and re-encrypts the message or data received from client device 110 using the receiver client device's keys with, for example, hardware key generation or Hardware Security Modules (HSMs). Timestamps/counters may be used to prevent replays. Secure SMS service provider 330 may have a public key inside Crypto block 130 of client device 110. As discussed above, Crypto block 130 may generate a MAC key and encrypt a message or data with such MAC key. The keys may be encrypted using secure SMS service provider's 330 public key that may then be used to create a digital envelope. The counter and/or timestamp may be used for replay protection and MAC may be attached. Algorithms such as (i) an RSA algorithm with PKCS #1 padding, or (ii) Elliptic Curve Cryptography may be used with HMAC for encryption of the data.

When a user sends an SMS text message, the public key is sent along. An intended recipient is asked to verify possession of a public key by a standard method such as generating a hash, a random number or a time stamp. The recipient is then asked to sign and verify. Once this is done, public key encryption data is used as in standard methods by using the digital envelope created. In an example, the process includes receiving the HMAC timestamp and/or counter from the sender and comparing such HMAC timestamp and/or counter with a pre-determined timestamp and/or counter that makes appropriate sense to determine veracity. Once the received HMAC timestamp and/or counter is verified, the receiver then may run a known identifier, for example, the known IMSI number, the IMEI number or the Secure Element number or ID of the sender to verify authenticity. The position of the identifier is proven by the timestamp and/or counter and HMAC.

In block 435, Secure SMS service provider 330 may then send the re-encrypted SMS message or data to receiver client device 340 over network 320 via MNO 314.

In block 445, client device 340 receives the re-encrypted SMS message or data and is able to decrypt and read the message by using its built-in secure SMS application.

According to one or more embodiments, it is assumed that a user has previously registered with the remote location, for example, secure SMS service provider 330, to open a user account. In this regard, it will be appreciated that the user may have previously provided account information to secure SMS service provider 330 over network 320 through, for example, a secure connection between client device 110 (or client device 340) and secure SMS service provider 330. Alternatively, client device 110 (or client device 340) may be personalized during customization by operators, customizers and/or device manufacturers.

As a result of such previous registration, client device 110 or client device 340 stores a specific user identifier that may be used to identify the particular user as having a user account maintained by secure SMS service provider 330. The user identifier may be implemented, for example, as one or more cookies, operating system registry entries, hardware identifiers, or other types of identifiers.

Secure SMS service provider 330 may work with an MNO to put a certificate issued by the secure SMS service provider in Crypto block 130 of client device 110 and client device 340. As discussed above, Crypto block 130 may follow security guidelines such as FIPS 140-2 Level 2/3. Secure SMS service provider issued certificates already installed in client devices 110 and 340 may be done for personalization purposes. When customers or users activate their secure SMS service provider application, such as, for example, a payment service provider application, which may already be built into client devices 110 and 340, the users are asked to select a PIN, which may be optional or mandatory. The PIN protects the private key of the certificate.

When a transaction, for instance a financial transaction using SMS text messaging with client device 110, is made via secure SMS service provider 330, for example a payment service provider, secure SMS service provider 330 gets signature information of, for example, a X509 certificate. This X509 signature information is typically maintained for each user. The signature information may be a digital signature and may include a time stamp, dollar amount, transaction type, item, and location, which may be determined from a GPS enabled client device 110. Signature information may also be preloaded in client device 110 or client device 240 as EMV (Europay, MasterCard, Visa), or ECC, in addition to X509.

It should be noted that in a secure SMS flow using, for example, a secure SMS service provider, applications may be upgraded. All application upgrades would be signed by the secure SMS service provider. The applications would check periodically for any available updates. If an update is available and the user agrees, the application may be downloaded and the signature is verified. Once the signature is verified, the new application may be activated.

Although one or more embodiments have been described with respect to a remote location such as a secure SMS service provider, embodiments of the present disclosure may also be used by customers to send secure messages directly to each other.

In view of the present disclosure, it will be appreciated that various methods and systems have been described for secure SMS communications that may be used in conjunction with client device manufacturers wherein the client device, for example a mobile telephone device, includes for example a SIM card and/or SE, along with an ECC or RSA algorithm for public key encryption. The keys used therein are dynamic and may be managed by hardware.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A system comprising:
   a client device in communication with a remote location via a network;
   one or more processors; and
   one or more memories adapted to store a plurality of machine-readable instructions which when executed by the one or more processors is adapted to cause the system to:
   encrypt, internally by the client device, Short Message Service ("SMS") data;
   send the encrypted SMS data via a regular SMS interface of the client device to the remote location;
   if encrypted SMS data is received from the remote location:
     compare a received key with a pre-determined appropriate key to determine veracity;
     once the received key is verified, process a unique identifier associated with the remote location that is known by the client device so that a position of such identifier is proven; and
   decrypt, internally by the client device, the received encrypted SMS data,
   wherein secure or private SMS communications are exchanged over the regular SMS interface.

2. The system of claim 1, wherein the SMS data further comprises financial transaction information or sensitive information.

3. The system of claim 1, wherein the plurality of machine-readable instructions which when executed by the one or more processors is further adapted to cause the system to:
   encrypt the SMS data in a crypto component inside the client device.

4. The system of claim 1, wherein the plurality of machine-readable instructions which when executed by the one or more processors is further adapted to cause the system to:
   process the SMS data through a HMAC using an encryption algorithm; and
   apply the HMAC to a combination of a timestamp and/or counter and second factor authentication information.

5. The system of claim 4, wherein the second factor authentication information further comprises a token, an identifier of the client device, or an identifier of a user of the client device.

6. The system of claim 5, wherein the identifier of the client device further comprises a Secure Element number or identification (ID), an IMEI number, an IMSI number, or a unique number associated with a user of the client device.

7. The system of claim 1, wherein the plurality of machine-readable instructions which when executed by the one or more processors is further adapted to cause the system to encrypt the SMS data using Elliptic Curve Cryptography or an RSA algorithm.

8. The system of claim 1, wherein the plurality of machine-readable instructions which when executed by the one or more processors is further adapted to cause the system to:
   use three-factor authentication for exchanging the secure or private SMS communications, wherein a first factor comprises what a user of the client device knows including a password or a PIN, a second factor comprises what the user has including a token or the client device itself, and the third factor comprises what the user is, including biometrics information.

9. The system of claim 1, wherein the remote location further comprises a secure SMS service provider or key manager, and wherein the plurality of machine-readable instructions which when executed by the one or more processors is further adapted to cause the system to:
receive the encrypted SMS data at the remote location;
decrypt and re-encrypt the received SMS data at the remote location; and
send the re-encrypted SMS data to a second client device, wherein the re-encrypted SMS data is received at the second client device via a regular SMS channel of the second client device, and the received re-encrypted SMS data is decrypted internally by the second client device.

10. The system of claim 1, wherein the remote location further comprises a second client device.

11. A method comprising:
encrypting, electronically by a processor, Short Message Service ("SMS") data;
sending the encrypted SMS data via a regular SMS interface of a client device to a remote location;
if encrypted SMS data is received from the remote location:
comparing a received key with a pre-determined appropriate key to determine veracity;
once the received key is verified, processing a unique identifier associated with the remote location that is known by the client device so that a position of such identifier is proven; and
decrypting, electronically by the processor, the received encrypted SMS data,
wherein secure or private SMS communications are exchanged over the regular SMS interface.

12. The method of claim 11, wherein the SMS data further comprises financial transaction information or sensitive information.

13. The method of claim 11, wherein the encrypting further comprises encrypting the SMS data in a crypto component inside the client device.

14. The method of claim 11, wherein the encrypting further comprises:
processing the SMS data through a HMAC using an encryption algorithm; and
applying the HMAC to a combination of a timestamp and/or counter and second factor authentication information.

15. The method of claim 14, wherein the second factor authentication information further comprises a token, an identifier of the client device, or an identifier of a user of the client device.

16. The method of claim 11, wherein the encrypting further comprises using Elliptic Curve Cryptography or an RSA algorithm.

17. The method of claim 11, further comprising:
using three-factor authentication for exchanging the secure or private SMS communications, wherein a first factor comprises what a user of the client device knows including a password or a PIN, a second factor comprises what the user has including a token or the client device itself, and the third factor comprises what the user is, including biometrics information.

18. The method of claim 11, wherein the remote location further comprises a secure SMS service provider or key manager, and wherein the method further comprises:
receiving the encrypted SMS data at the remote location;
decrypting and re-encrypting the received SMS data at the remote location; and
sending the re-encrypted SMS data to a second client device, wherein the re-encrypted SMS data is received at the second client device via a regular SMS channel of the second client device, and the received re-encrypted SMS data is decrypted internally by the second client device.

19. The method of claim 11, further comprising sending the encrypted SMS data via a regular SMS interface of the client device directly to a second client device.

20. A non-transitory computer readable medium on which are stored computer readable instructions and, when executed by a processor, cause the processor to:
encrypt Short Message Service ("SMS") data;
send the encrypted SMS data via a regular SMS interface of a client device to a remote location;
if encrypted SMS data is received from the remote location:
compare a received key with a pre-determined appropriate key to determine veracity;
once the received key is verified, process a unique identifier associated with the remote location that is known by the client device so that a position of such identifier is proven; and
decrypt the received encrypted SMS data,
wherein secure or private SMS communications are exchanged over the regular SMS interface.

* * * * *